United States Patent
Iihara et al.

(10) Patent No.: US 7,000,319 B2
(45) Date of Patent: Feb. 21, 2006

(54) METHOD OF MANUFACTURING OUTER RACES FOR TRIPOD-TYPE CONSTANT VELOCITY UNIVERSAL JOINTS

(75) Inventors: Michio Iihara, Iwata (JP); Yoshihiro Sagisaka, Iwata (JP); Takeshi Shinkai, Iwata (JP)

(73) Assignee: NTN Corporation, Osaka (JP)

( * ) Notice: Subject to any disclaimer, the term of this patent is extended or adjusted under 35 U.S.C. 154(b) by 9 days.

(21) Appl. No.: 10/033,910

(22) Filed: Jan. 3, 2002

(65) Prior Publication Data
US 2002/0092168 A1 Jul. 18, 2002

(30) Foreign Application Priority Data
Jan. 16, 2001 (JP) .............................. 2001-007272

(51) Int. Cl.
*B21D 53/10* (2006.01)
(52) U.S. Cl. .............. 29/898; 29/898.042; 29/898.066; 72/348; 72/349; 72/370.1
(58) Field of Classification Search ........... 29/898.066, 29/898, 898.04, 898.042, 898.06; 72/370.1, 72/370.03, 355.4, 347, 348, 349, 370.01; 464/111, 145, 143
See application file for complete search history.

(56) References Cited

U.S. PATENT DOCUMENTS

| | | | | |
|---|---|---|---|---|
| 4,369,558 A | * | 1/1983 | Iwata et al. ............. | 29/898.066 |
| 5,001,920 A | * | 3/1991 | Ishinaga et al. ............... | 72/345 |
| 5,007,266 A | * | 4/1991 | Nishiuchi et al. ............... | 72/44 |
| 5,186,082 A | * | 2/1993 | Kuramitsu et al. ......... | 76/107.1 |
| 5,697,245 A | * | 12/1997 | Maeng ....................... | 72/353.4 |
| 5,765,430 A | * | 6/1998 | Iihara et al. ................ | 72/353.4 |
| 6,055,838 A | * | 5/2000 | Ohama et al. ................. | 72/356 |
| 6,105,413 A | * | 8/2000 | Duggan et al. ............ | 72/370.1 |
| 6,146,281 A | * | 11/2000 | Iijima et al. ................. | 464/139 |
| 6,224,490 B1 | * | 5/2001 | Iihara et al. ................ | 464/145 |
| 6,422,946 B1 | * | 7/2002 | Iihara et al. ................ | 464/146 |
| 6,438,844 B1 | * | 8/2002 | Nolden ................... | 29/898.066 |

(Continued)

FOREIGN PATENT DOCUMENTS

EP 1291539 A2 * 3/2003

(Continued)

OTHER PUBLICATIONS

Hiroshi, Aoyama, et al. "Manufacture of Outer Ring Part in Constant Velocity Universal Joint", Patent Abstracts of Japan, Feb. 29, 2000, pp. 1-2.

*Primary Examiner*—Essama Omgba

(57) ABSTRACT

To make a peripheral lip region to be formed with chamfered portions by the use of a plastic working technique, to enable the use of a cup forming punch of a simplified shape so that a mold used therewith can be easily assembled and the punch when worn down can easily be repaired, a method of making an outer race of a constant velocity universal joint of a tripod type includes an upsetting step during which not only are outer peripheral shapes of a small diameter portion (W3$a$) and a large diameter portion (W3$b$) defined, but a recess (Wb) having a tapered peripheral wall face (Wba), which eventually defines general shapes of the chamfered portions (10) of the outer race (1), is formed in an end face of the large diameter portion (W3$b$). During a cup forming step, the tapered peripheral wall face (Wba) defined during the upsetting step is rearwardly pushed while its shape is maintained. Thereafter, a cup drawing step is carried out to finish the tapered peripheral wall face (Wba) to represent the final design shapes of the chamfered portions (10).

14 Claims, 6 Drawing Sheets

U.S. PATENT DOCUMENTS 6,516,647 B1 * 2/2003 Hirschvogel et al. .......... 72/67
6,557,257 B1 * 5/2003 Johnson et al. ........ 29/898.066

FOREIGN PATENT DOCUMENTS

| JP | 403060839 A | * | 3/1991 | ................ 72/355.4 |
| JP | 403060840 A | * | 3/1991 | ................ 72/356 |
| JP | 411247877 A | * | 9/1999 | |
| JP | 2000-61576 | | 2/2000 | |
| JP | 02003004061 A | * | 1/2003 | |
| WO | WO 03/002284 A1 | * | 1/2003 | |

* cited by examiner

Fig. 2
(A) PREFORMING
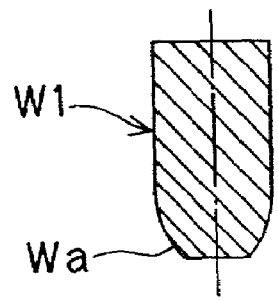
(B) AXIAL DRAWING
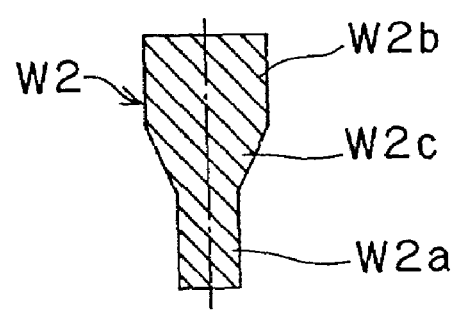
(C) UPSETTING
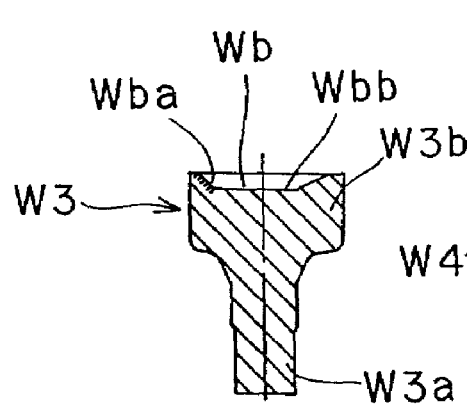
(D) CUP FORMING
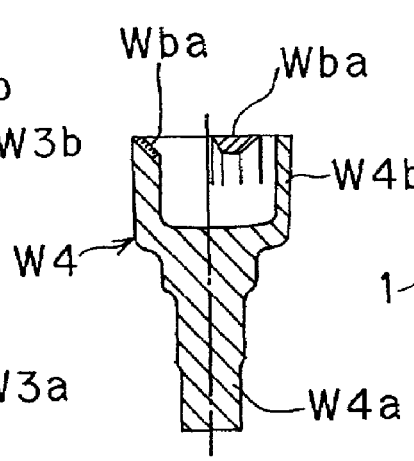
(E) CUP DRAWING
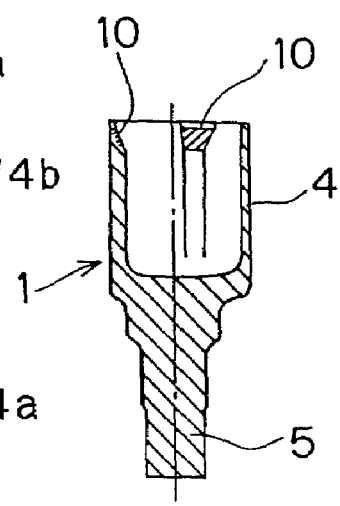

METHOD OF MANUFACTURING OUTER RACES FOR TRIPOD-TYPE CONSTANT VELOCITY UNIVERSAL JOINTS

BACKGROUND OF THE INVENTION

1. Field of the Invention

The present invention relates to a method of manufacturing an outer race for a constant velocity universal joint of a tripod type, mainly for automotive use, by the utilization of a plastic working process and, more particularly, to the method of the kind referred to, wherein a chamfered area of a peripheral lip region of an opening is subjected to the plastic working process.

2. Description of the Prior Art

The constant velocity universal joint of the tripod type generally includes an outer race having a cup body formed with three track grooves, an inner race positioned inside the outer race, and rolling elements intervening between the outer and inner races in operative engagement with the associated track grooves. In this type of the constant velocity universal joint, assuming that the outer and inner races are rotating in unison with each other, a shaft coupled with the inner race can undergo a rocking motion relative to the outer race while pivoting about the center of pivot defined within the inner race. In order to avoid the possibility of the shaft interfering with a peripheral lip region of the cup body during the rotation thereof, one end of each of reduced diameter portions defined between the neighboring track grooves adjacent the peripheral lip region of the cup body is chamfered to provide a respective chamfered portion.

While the chamfered portions are generally defined by the use of a cutting process, the use of the cutting process is undesirable in terms of productivity and yield of production. For this reason, the use of a plastic working technique to define the chamfered portions is desirable. The outer race making method including a plastic working process to form the chamfered portions is disclosed in, for example, the Japanese Laid-open Patent Publication No. 2000-61576.

According to the above mentioned publication, an intermediate member which eventually forms the outer race is prepared by means of a combined pushing process including a forward pushing and a rearward container pushing, to thereby form a cup portion and, during this cup forming process, the chamfered portions are plastically formed by the use of a punch used to form the track grooves. Thereafter, during the subsequent drawing process to form the outer race to have a final design dimension and shape, the chamfered portions are also finished.

However, since the chamfered portions are formed during the cup forming process, the punch used to form the cup portion is required to have a complicated shape wherein. Specifically, the punch must be stepped so that a tapered peripheral surface area that eventually defines the chamfered portions can be formed at a portion of the punch intermediate of the length thereof. Since the punch for formation of the cup portion is one of elements of a mold used to define the track grooves and the reduced diameter portion between the neighboring track grooves, such punch has a relatively complicated shape. Accordingly, if the tapered surface area referred to above is formed to render the punch to represent a stepped configuration, the punch is indeed complicated considerably in shape. For this reason, the punch for formation of the cup portion will become difficult to manufacture and, more over, once such punch is worn down, repair thereof is difficult to achieve. By way of example, if when the punch is worn down the punch is desired to be repaired by removing a worn end portion thereof, the tapered area must also be repaired, making it difficult to repair the punch.

SUMMARY OF THE INVENTION

Accordingly, a primary object of the present invention is to provide a method of making an outer race used in the constant velocity universal joint of a tripod type, wherein the chamfered portions at the peripheral lip region of the cup body can be formed by a plastic working technique and other portions thereof can be formed by the use of molds of a simplified shape.

Another object of the present invention is to facilitate the use of a punch of a simplified shape for formation of the cup body and also to facilitate repair of the punch even when the punch is worn down.

A further object of the present invention is to finish the chamfered portions by the use of the plastic working process.

In order to accomplish these objects of the present invention, a method of manufacturing an outer race used in a constant velocity universal joint of a tripod type is applicable where the constant velocity universal joint includes a cup body and a shaft extending axially outwardly from a bottom of the cup body in a direction opposite to an open end thereof, and the cup body has an inner peripheral surface formed with three axially extending track grooves. The cup body includes a radially outwardly protruding wall portion, aligned with each of the track grooves, and a radially inwardly depressed wall portion aligned with a reduced diameter portion of the peripheral wall of the cup body between the neighboring track grooves, wherein the protruding and depressed wall portions are so defined as to alternate with each other in a direction substantially circumferentially of the cup body, each of the reduced diameter portion of the peripheral wall of the cup body adjacent the open end of the latter having a chamfered portion defined at a peripheral lip region of the open end of the cup body. The outer race manufacturing method of the present invention is featured in the use of the following step.

Specifically, the outer race manufacturing method of the present invention includes an upsetting step in which a reduced diameter portion which eventually defines the shaft, a large diameter portion which eventually defines the cup body, and respective general shapes which eventually define the associated chamfered portions are formed by means of an upsetting technique.

According to the foregoing outer race manufacturing method, since general shapes of the eventually formed chamfered portions are defined during the upsetting step in which the reduced diameter portion, which eventually defines the shaft, and the large diameter portion which eventually defines the cup body are formed, there is no need to use shaping surfaces for formation of the chamfered portions during the subsequent formation of the cup body by a mold. Accordingly, such mold can be simplified. Although the mold used during the upsetting step requires the shaping surfaces to be provided in the upsetting mold for forming the chamfered portions, the material to be upset during the upsetting step is of a simple shape and, therefore, the use of the mold of a simplified shape is sufficient and the provision of molding surface portions for defining the general shape of the chamfered portions does not necessarily result in complication of the shape of the mold.

In practice, however, the outer race manufacturing method of the present invention is practiced using the following steps. Specifically, the outer race manufacturing method of the present invention includes an upsetting step for making a generally elongated intermediate member having a small diameter portion and a large diameter portion with an axially inwardly depressed recess defined in an end face of the large diameter portion remote from the small diameter portion, wherein the recess has a tapered peripheral wall face which eventually defines a general shape of each of the chamfered portions; a cup forming step for shaping the elongated intermediate members to a shape having the cup body by means of a combined pushing method including a forward pushing and a rearward container pushing; and a drawing step for shaping the cup body to a final design dimension and shape by means of a drawing technique.

Since during the upsetting step the recess is defined in the end face of the large diameter portion and a portion of the inner peripheral surface surrounding the recess is formed with a tapered or inclined peripheral wall face that represents a general shape of each chamfered portions, mere formation of the recess of a shallow depth during the upsetting step is sufficient to allow the general shapes of the chamfered portions to be defined. For this reason, the general shapes of the chamfered portions can easily be defined.

Preferably, the cup forming step is performed by the combined pushing method using a die for forming the shaft and the cup body and a straight punch for forming the track grooves and the reduced diameter portion between the neighboring track grooves.

According to this method, since the general shapes of the chamfered portions are pre-defined during the upsetting step, the cup forming step can be carried out without the tapered peripheral wall face, which eventually forms the chamfered portions, being constrained. For this reason, there is no need to provide the cup forming punch with the shaping area corresponding to the tapered peripheral wall face and the cup forming punch may be employed in the form of a straight punch, that is, a punch having a uniform transverse sectional shape over the entire length thereof.

Since the cup forming punch is one of elements of the mold used to form the track grooves and the reduced diameter portion between the neighboring track grooves, it tends to become relatively complicated in shape. However, in the practice of the present invention, since the cup forming punch need not be provided with the shaping area corresponding to the tapered peripheral wall face, the cup forming punch employed in the practice of the present invention may be in the form of the straight punch similar to that generally used in the conventional manufacture of the outer race having no shaping surfaces for forming chamfered portion. Accordingly, manufacture of the cup forming punch that can be used in the practice of the present invention does not become complicated and, even when the punch has its working end worn down, a simple repair procedure to remove the worn working end thereof is sufficient to allow the remaining portion of the punch to be reused. This is possible because the cup forming punch used in the present invention is in the form of the straight punch.

In a preferred embodiment of the present invention, the drawing step may be specifically carried out by using a die for forming the cup body, and a punch for forming the track grooves, the reduced diameter portion between the neighboring track grooves, and the chamfered portion at one end of each of the reduced diameter portions adjacent the open end of the cup body.

In such case, the chamfered portions of the general shapes defined during the upsetting step described above are finally shaped by the punch used during the drawing step to the final design shape. For this reason, even though the chamfered portions are non-constraint during the drawing step, the chamfered portions can be precisely and accurately finished during the drawing step. As thus described, the chamfered portions can be finished only by replying on the plastic working and the mold used during the cup forming step can have a simplified shape. Although the punch used during the drawing step is complicated as is the case with the conventional manufacture of the outer race having the chamfered portions defined by the plastic working process, the load on the punch is relatively so small that there should be no problem associated with the frictional wear and, also, no necessity of the punch being repaired.

If desired, the outer race manufacturing method of the present invention may additionally include an axial pushing step. This axial pushing step is to be performed prior to the upsetting step, for axially pushing a cylindrical rod member to form a small diameter portion, a large diameter portion and an intermediate portion connecting the small and large diameter portions together and flaring outwardly in a direction from the small diameter portion towards the large diameter portion.

The additional use of the axial pushing step is advantageous in that since the intermediate member that is subsequently subjected to the upsetting step can be pre-defined during the axial pushing step, the amount of the intermediate member that is treated (i.e., deformed) during the upsetting step can be reduced to facilitate the upsetting step.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 shows the sequence of a plastic working process employed in the practice of the outer race manufacturing method of the present invention by schematic sectional views;

DETAILED DESCRIPTION OF THE EMBODIMENT

Figure 1A:
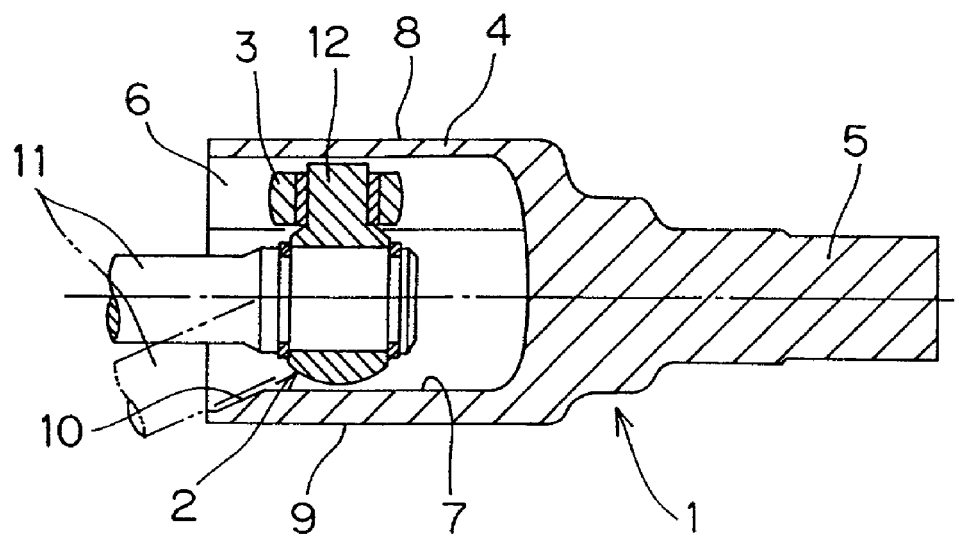
FIG. 1A is a longitudinal sectional view of a constant velocity universal joint of a tripod type utilizing an outer race manufactured by an outer race manufactured method according to a preferred embodiment of the present invention.
Figure 1B:
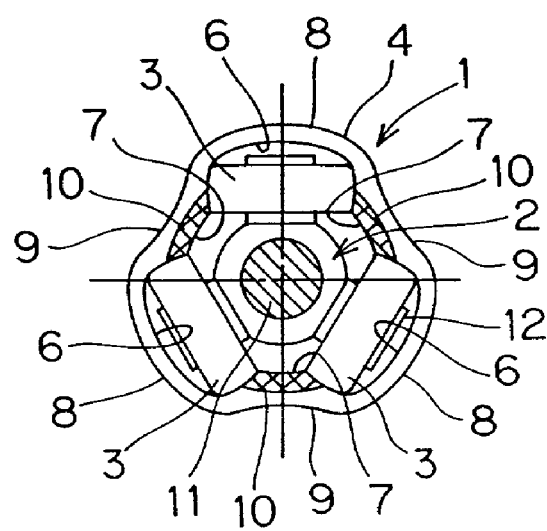
FIG. 1B is a front elevational view, with a portion broken away, of the constant velocity universal joint shown in FIG. 1A.

A preferred embodiment of the present invention will now be described. As shown in FIGS. 1A and 1B, a constant velocity universal joint of a tripod type employing an outer race manufactured in accordance with the present invention includes, in addition to the outer race 1, an inner race 2 and three rolling elements 3. The outer race 1 in turn includes a cup body 4 and a first shaft 5 extending outwardly from a bottom or closed end of the cup body 4 in coaxial relation therewith. The cup body 4 has its inner peripheral surface formed with three track grooves 6 defined therein so as to extend axially thereof and spaced an equal distance from each other in a direction substantially circumferentially thereof.

Notwithstanding the presence of the track grooves 6, the cup body 4 has a peripheral wall and the presence of the track grooves 6 in the inner peripheral surface of the cup body 4 leaves the peripheral wall of the cup body 4 to have a radially outwardly protruding wall portion 8 aligned with each of the track grooves 6 and a radially inwardly depressed wall portion 9 aligned with a reduced diameter portion 7 of the peripheral wall of the cup body 4 between the neighboring track grooves 6, said protruding and depressed wall portions 8 and 9 being so defined as to alternate with each other in a direction substantially circumferentially of the cup body 4. Accordingly, when viewed in a transverse sectional view, the outer race 1 generally represents a three-lobed shape or a shape similar to the shape of the three-petal corolla of a flower.

The cup body has an open end opposite to the bottom thereof, and a portion of an inner peripheral lip region of such open end that is aligned with each of the radially inwardly depressed wall portions 9 is chamfered at 10 so that when the cup body 4 is viewed in a longitudinal sectional view as in FIG. 1A, these chamfered portions 10 can extend so as to converge at a point within the cup body 4. In FIG. 2B, the chamfered portions 10 are shown as cross-hatched.

On the other hand, the inner race 2 positioned inside the cup body 4 is mounted fixedly on, or otherwise formed integrally with, a second shaft 11 so as to extend axially outwardly from the cup body 4. This inner race 2 has its outer peripheral surface formed integrally with three circumferentially equally spaced stud shafts 12 so as to extend radially outwardly therefrom. Each of the stud shafts 12 has a corresponding rolling element 3 rotatably mounted thereon. Each of the rolling elements 3 is in the form of a generally ring-shaped roller having its outer peripheral surface radially outwardly rounded so as to represent a spherical shape. On the other hand, each of the track grooves 6 so defined in the inner peripheral surface of the cup body 4 is of a generally U-shaped cross-section delimited by opposite side faces and a bottom face, wherein the opposite side faces are inwardly concaved so as to represent a shape that is substantially complemental to the spherical outer peripheral surface of the associated rolling element 3. It is, however, to be noted that the bottom face of each track groove 6 is radially inwardly concaved so as to have a radius of curvature greater than that of each of the opposite side faces of the respective track groove 6.

The constant velocity universal joint of the tripod type discussed above is so designed and so configured that while the rolling elements 3 mounted on the inner race 2 through the associated stud shafts 12 can move freely within the respective track grooves 6 in a direction lengthwise of the track grooves 6, i.e., in a direction axially of the cup body 4, they cannot rotate relative to the cup body 4 about the longitudinal axis of the cup body 4. Accordingly, even though the outer race 1 and the inner race 2 do not align axially with each other and the second shaft 11 rigid or integral with the inner race 2 fluctuates relative to the outer race 1 and, hence, the first shaft 5 integral with the cup body 4 to accommodate wheel turning angle, a rotational drive force can be transmitted between the first shaft 5 and the second shaft 11. The chamfered portions 10 of the cup body 4 are so defined and so utilized as to allow the second shaft 11 rigid or integral with the inner race 2 to fluctuate a relatively large angle relative to the outer race 1, as shown by the phantom line in FIG. 1A, without being interfered with the peripheral lip region.

The outer race 1 used in the constant velocity universal joint of the structure described above is manufactured in a manner which will now be described. Referring now to FIG. 2 showing the sequence of a plastic working process employed in the practice of the outer race manufacturing method of the present invention, at the outset, using any known upsetter, a metal bar (not shown) is upset to preform, as shown in view (A) of FIG. 2, a first intermediate rod, i.e., a generally cylindrical rod W1 having a peripheral edge of one end thereof constricted radially inwardly as at Wa. It is, however, to be noted that the radially inwardly constricted end portion Wa may not be formed at one end of the cylindrical rod W1 if so desired.

Subsequently, as shown in view (B) of FIG. 2, the cylindrical rod W1 is extruded, or otherwise pushed axially forwardly to provide a second intermediate rod W2 of a shape including a small diameter portion W2a, a large diameter portion W2b and a tapered intermediate portion W2c connecting the small and large diameter portions W2a and W2b together and flaring outwardly in a direction from the small diameter portion W2a towards the large diameter portion W2b. Where the cylindrical rod W1 has the radially inwardly constricted end portion Wa, a portion having the radially inwardly constricted end portion Wa is set to define the small diameter portion W2a.

The second intermediate rod W2 is again upset to provide a third intermediate rod W3 as shown in view (C) of FIG. 2. As a result of this upsetting process to provide the third intermediate rod W3, the third intermediate rod W3 is so formed and so shaped as to have a small diameter portion W3a and a large diameter portion W3b with a recess Wb defined in an end face of the large diameter portion W3b remote from the small diameter portion W3a that is recessed axially inwardly thereof. The recess Wb is delimited by a flat bottom face Wbb and a tapered peripheral wall face Wba that is flared axially outwardly of the large diameter portion W3b. This recess Wb should have a depth sufficient to render portions of the peripheral wall face Wba to eventually define the chamfered portions 10 referred to hereinbefore.

Subsequent to the upsetting process to provide the third intermediate rod W3, the third intermediate rod W3 is subjected to a cup forming process including a similar axial forward drawing and a rearward cup or container pushing, to thereby provide a fourth intermediate rod W4 as shown in view (D) of FIG. 2. This fourth intermediate rod W4 is of a shape including a shaft W4a and a cup portion W4b. During this cup forming process, the tapered peripheral wall face Wba referred to above has remained non-constrained, that is, has been left untreated.

The fourth intermediate rod W4 shown in FIG. 2D is then subjected to a cup drawing process to complete the outer race 1 as shown in view (E) of FIG. 2. Specifically, using any known drawing technique, the fourth intermediate rod W4 is finished so as to have the intended shape and the intended dimensional features. As a matter of course, by this drawing process, the tapered peripheral wall face Wba is reshaped to provide the chamfered portions 10.

Figure 3:
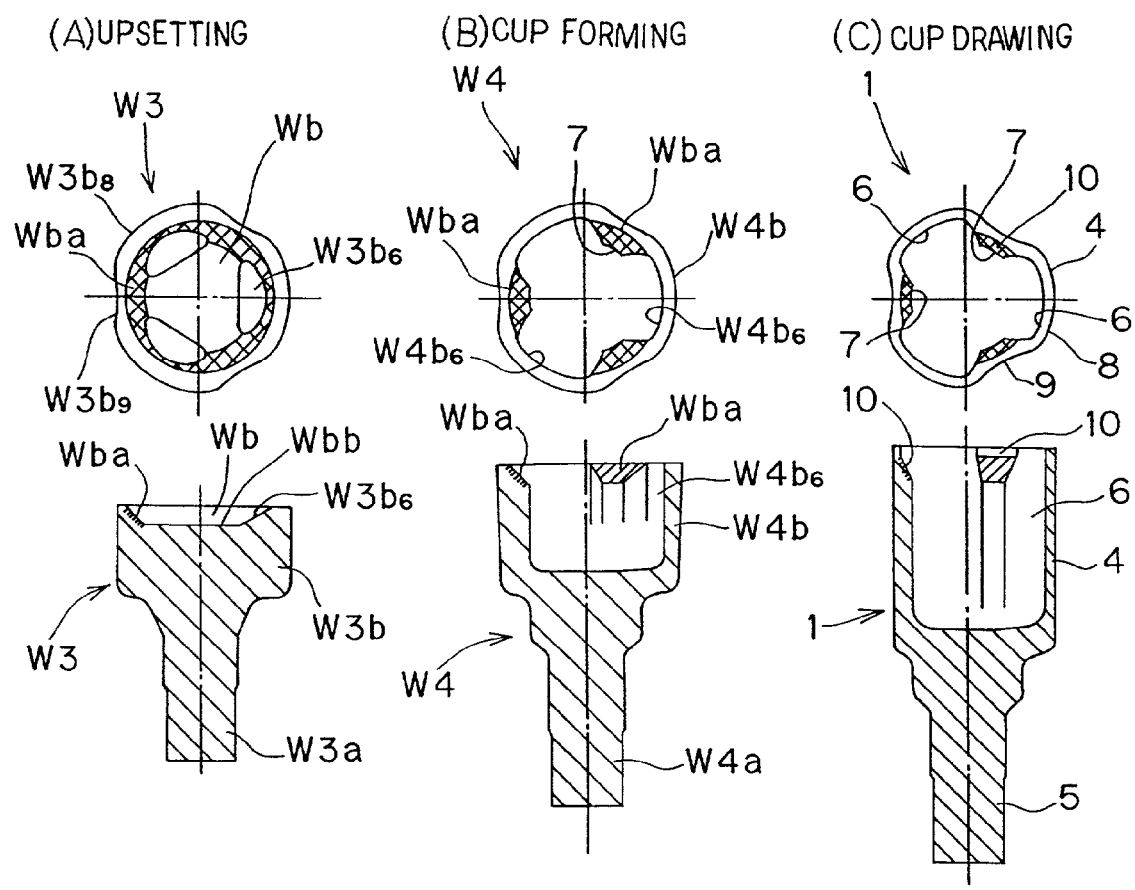
FIG. 3 shows showing an upsetting step of the outer race manufacturing method of the present invention by front elevational and longitudinal sectional views of the outer race.

Transverse and longitudinal sectional representations of the third intermediate rod W3 formed as a result of the upsetting process shown in views (C)–(E) of FIG. 2 are shown in views (A) to (C) of FIG. 3, respectively, in each of which views contains a front elevational representation on an upper side and a longitudinal sectional representation on a lower side As can be readily understood from the front elevational representation in view (A) of FIG. 3, during the upsetting process, the large diameter portion W3$b$ has its sectional contour generally similar to the sectional contour of the cup body 4 of the completed outer race 1 as shown in view (C) of FIG. 3 with radially outwardly protruding wall portions W3$b_8$ and radially inwardly protruding wall portions W3$b_9$ defined therein. The inner peripheral surface of the recess Wb is formed with three inclined flat face portions W3$b_6$ at respective circumferential locations, which eventually define the corresponding track grooves 6 in the completed outer race 1. Accordingly, the tapered peripheral wall face Wba extends a depth enough to reach the bottom face of the recess Wb at a location between the neighboring flat face portions W3$b_6$ and is defined only at the peripheral lip region of the recess Wb at a location aligned with each respective flat face portion W3$b_6$.

As shown in view (B) of FIG. 3, during the cup forming process, axially extending grooves W4$b$6 of a shape generally corresponding to the shape that eventually forms track grooves 6 are also formed in the cup portion 4Wb as a result of the rearward container pushing sub-process.

Figure 5:
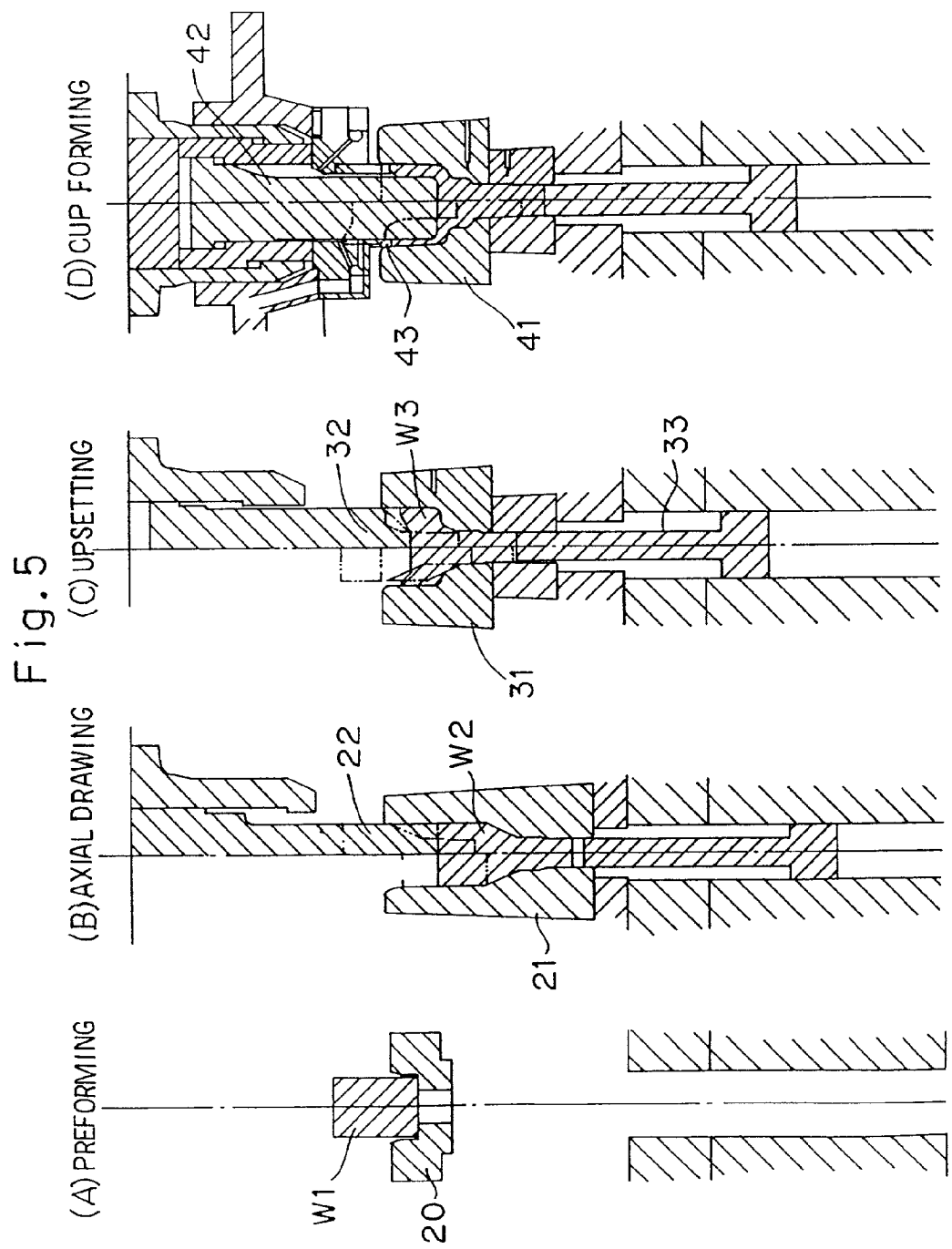
FIG. 5 shows the details of the molds used in various steps of the outer race manufacturing method of the present invention, respectively, by longitudinal sectional views.
Figure 6:
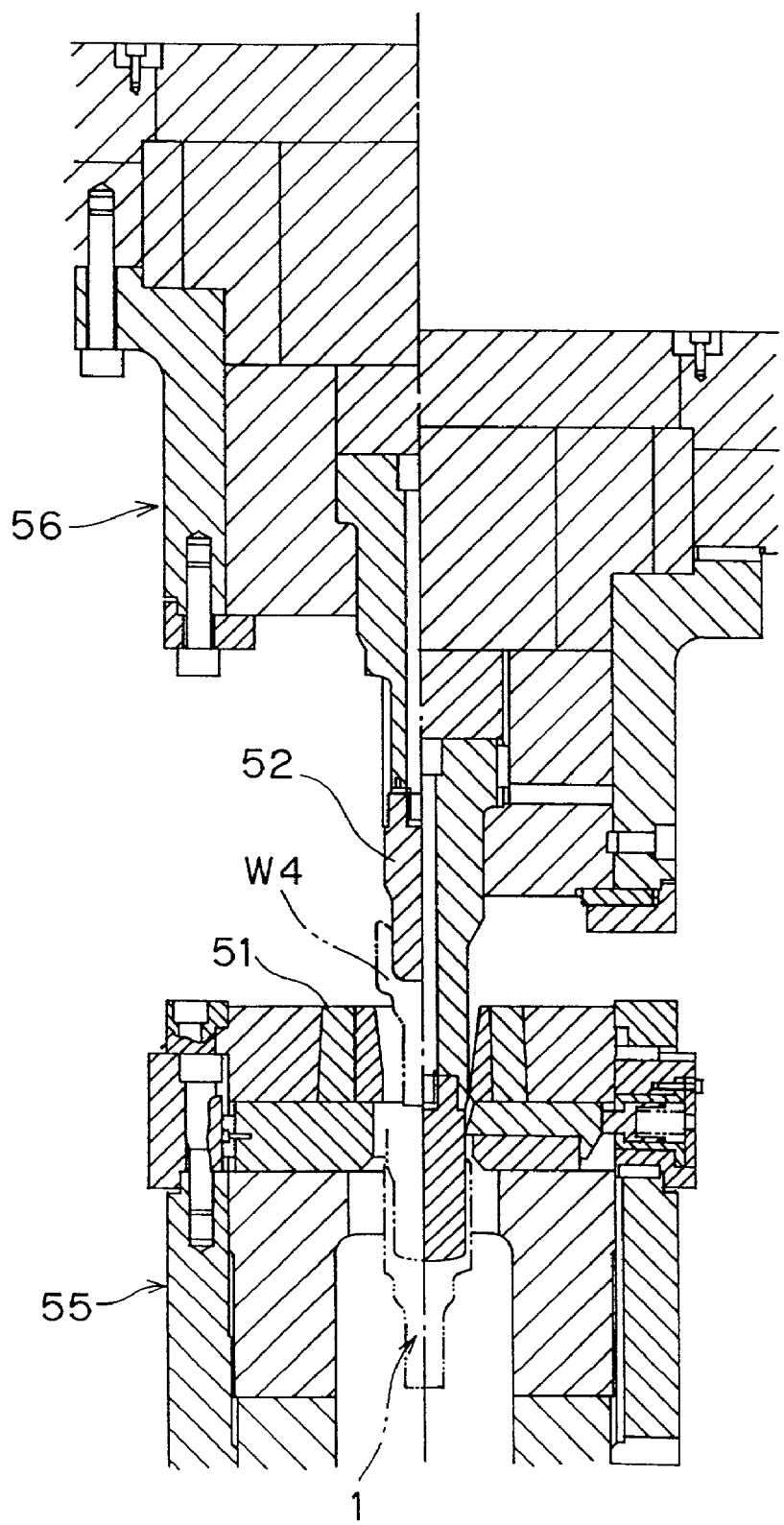
FIG. 6 is a longitudinal sectional view showing the details of the mold used during the cup drawing step of the outer race manufacturing method of the present invention.

FIG. 5 includes views (A) to (D) illustrating the details of molds used in the practice of the processes shown in views (A) to (D) of FIG. 2, respectively, whereas FIG. 6 illustrates the details of a mold used during the cup drawing process.

As shown in view (A) of FIG. 5, the preforming process shown in view (A) of FIG. 2 is carried out by the use of a preforming mold 20.

As shown in view (B) of FIG. 5, the axial drawing process shown in view (B) of FIG. 2 is carried out by the use of a mold including a die 21 and a punch 22. The die 21 has a bore of a shape complemental to the shape of the outer peripheral surface of the second intermediate rod W2 and, hence, has a large diameter bore portion, a small diameter bore portion and a tapered intermediate bore portion defined therein. The punch 22 has a cross-sectional shape sufficient to substantially fit into the large diameter bore portion of the die 21.

As shown in view (C) of FIG. 5, a mold used during the upsetting process shown in view (C) of FIG. 2 includes a die 31, a punch 32 above the die 31 and an ejector 33 below the die 31.

Also as shown in view (D) of FIG. 5, the cup forming process shown in view (D) of FIG. 2 is carried out by the use of a mold including a die 41, a punch 42 and a stripper 43 used to separate the work from the punch 42.

Figure 4:
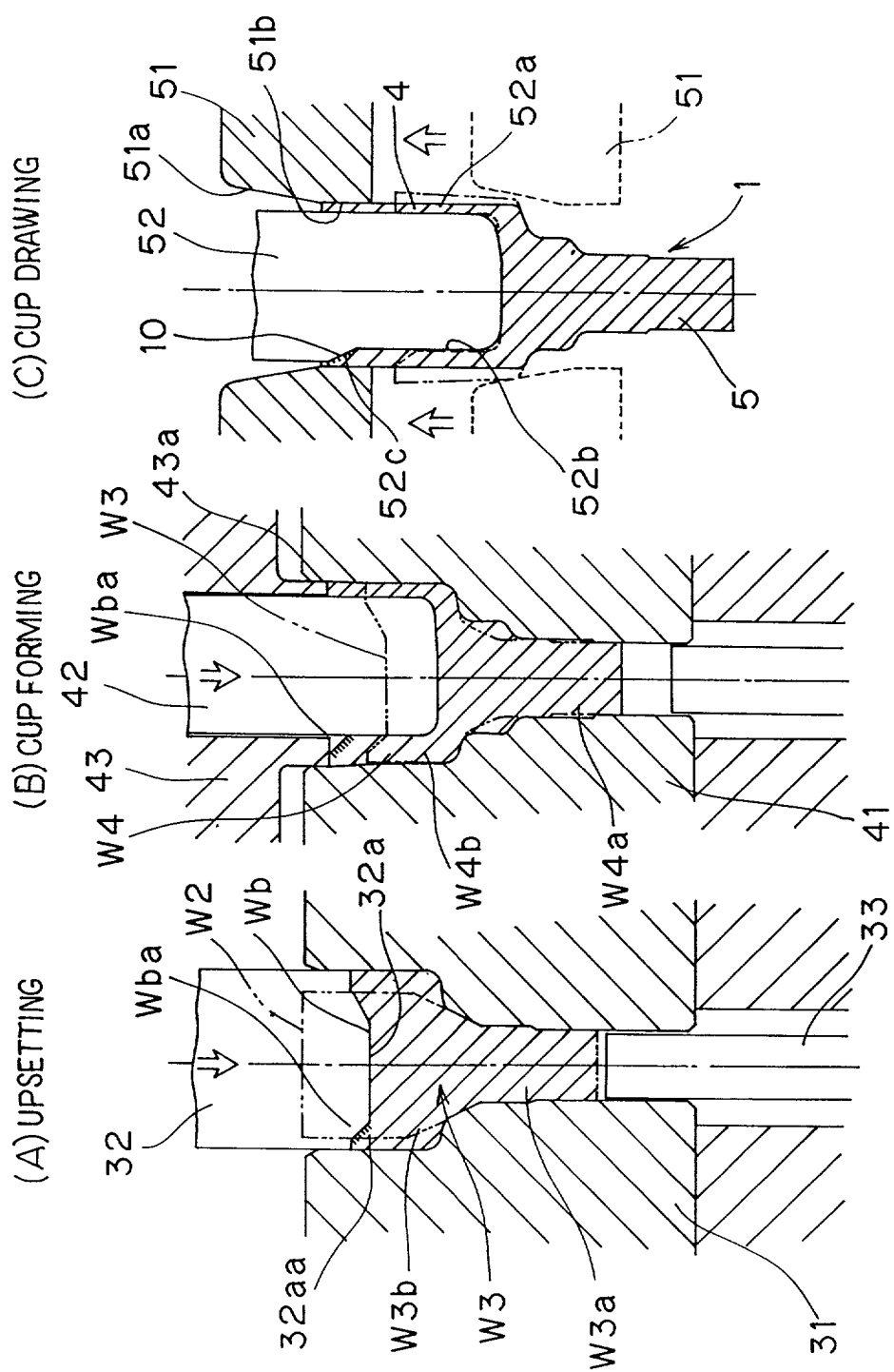
FIG. 4 shows the outer race being successively subjected to the upsetting, cup forming and cup drawing steps of the outer race manufacturing method of the present invention, shown together with corresponding molds by longitudinal sectional views.

The details of the molds used during the upsetting process, the cup forming process and the cup drawing process shown in views (C) to (E) of FIG. 2 are shown in views (A) to (C) of FIG. 4.

Referring to view (A) of FIG. 4, the die 31 used during the upsetting process has an inner peripheral surface of a shape that defines the small diameter portion W3$a$ and the large diameter portion W3$b$ of the third intermediate rod W3. The punch 32 positioned above the third intermediate rod W3 has a forward working end face 32$a$ so shaped as to define the recess Wb in the third intermediate rod W3. Specifically, the working forward end face 32$a$ of the punch 32 has a shaping portion 32$aa$ of a shape that subsequently defines the tapered peripheral wall face Wba in the third intermediate rod W3. This working forward end face 32$a$ of the punch 32 also has a single sided portion that subsequently defines the flat bottom face W3$b_6$ (view (A) of FIG. 3) of the recess Wb in the third intermediate rod W3. The ejector 33 shown therein and positioned below the third intermediate rod W3 is in the form of a round rod sufficient to fit into the small diameter bore portion of the die 31.

Referring now to view (B) of FIG. 4, the die 41 used during the cup forming process has an inner peripheral surface of a shape that defines the cup portion W4$b$ and the shaft W4$a$ of the fourth intermediate rod W4. The punch 42 is in the form of a straight punch and has its outer peripheral surface so shaped as to define the track grooves 6 (W4$b_6$) and the reduced diameter portions 7 between the neighboring track grooves 6 and also has a forward working end face so shaped as to define the flat bottom face of the cup portion W4$b$. The stripper 43 is a carrier member into which the punch 42 is fitted so that the punch 42 can be moved up and down relative to the stripper 43, and has its undersurface formed with a tubular body 43$a$ that can be removably fitted into an upper region of a shaping bore of the die 41. This tubular body 43$a$ has a transverse sectional shape complemental to that of the cup portion W4$b$. It is, however, to be noted that the use of the tubular body 43$a$ is not always essential and, if employed, may have a transverse sectional shape that may not be complemental to that of the cup portion W4$b$. Although an annular free end face of the tubular body 43$a$ is so defined and so utilized as to be brought into engagement with an annular upper end face of the peripheral wall of the cup portion 4$b$ that has been extended by the rearward container pushing, the tapered peripheral wall face Wba will not be constrained thereby.

During the cup drawing process and as shown in view (C) of FIG. 4, the die 51 and the punch 52 are used. An upper portion of an inner peripheral surface of the die 51 defines an upwardly flared guideway 51$a$ and a lower portion of the inner peripheral surface of the die 51 defines a drawing surface region 51$b$. The drawing surface region 51$b$ of the die 51 has an inner peripheral surface of a shape and dimension sufficient to represent outer peripheral surface of the completed cup body 4.

The punch 52 has its outer peripheral surface formed with shaping regions 52$a$, 52$b$ and 52$c$ that eventually define the track grooves 6, the reduced diameter portions 7 between the neighboring track grooves 6 and the chamfered portions 10 each at one end of the corresponding reduced diameter portion 7.

As shown in FIG. 6, the die 51 is positioned on a lower mold support 55 whereas the punch 52 is carried by an upper mold support 56 that can be driven up and down relative to the lower mold support 55. During the cup drawing process, the fourth intermediate rod W4 can be drawn by the punch 52 into the bore of the die 51.

According to the outer race manufacturing method discussed hereinbefore, the chamfered portions 10 can be generally formed by the upsetting process, and the fourth intermediate rod W4 is formed by pushing it rearwardly without the tapered peripheral wall face Wba being constrained by the mold, but with the tapered peripheral wall face Wba being maintained. Accordingly, the punch 42 used to define the cup body 4 is not complicated in shape and can easily and inexpensively be manufactured and repaired.

In other words, during the upsetting process, not only can respective outer peripheral shapes of the small diameter portion W3a and the large diameter portion W3b be defined, but the recess Wb having the tapered peripheral wall face Wba that is generally positioned adjacent the chamfered portions 10 in the outer race cup body 4 can also be defined in the end face of the large diameter portion W3b so as to be recessed axially inwardly thereof. During the cup forming process, the tapered peripheral wall face Wba formed as a result of the upsetting process is pushed rearwardly while the shape thereof is maintained. Accordingly, during the cup forming process, without the tapered peripheral wall face Wba being constrained, the intermediate rod W4 having the tapered peripheral wall face Wba can be obtained.

As hereinbefore discussed, since during the cup forming process the tapered peripheral wall face Wba is not constrained, the shaping punch 42 need not have a shaping portion corresponding to the tapered peripheral wall face. For this reason, the punch 42 having a straight shape (i.e., having a transverse sectional shape uniform over the entire length thereof) can be advantageously employed as is the case with the conventional manufacture of the outer race having no chamfered portion. Accordingly, the punch 42 is not complicated in shape and can easily be manufactured. Even when the punch 42 is worn down, a simple repair procedure to remove a free end portion thereof that has been worn down is sufficient to allow the remaining portion of the punch 42 to be reused. This is possible because the punch 42 is in the form of the straight punch.

Also, since the tapered peripheral wall face Wba in the fourth intermediate rod W4 is shaped to the final design dimension and shape upon completion of the drawing process, the chamfered portions 10 of the outer race can be precisely finished merely by the utilization of a plastic working technique. Although the chamfered portions 10 can be defined and shaped satisfactorily even though the shaping of the tapered peripheral wall face Wba during the drawing process is omitted, formation of the tapered peripheral wall face Wba during the upsetting process followed by reformation thereof during the drawing process is effective to avoid uneven axial alignment of the chamfered portions 10 as minimal as possible. Also, the load on the punch 52 serving as the drawing mold can be lessened, making it possible to avoid any possible end face cracking which would otherwise result in from an excessive draught of the chamfered portions 10.

During the cup forming process, the tapered peripheral wall face Wba of the cup portion W4b in the fourth intermediate rod W4 may be constrained by the stripper 43 to thereby increase the precision further. In such case, however, the tubular body 43a of a punch guide 43 would represent a tool of a shape similar to a cone from which an inner periphery is bored. Because of this, it would result in as if a wedge having a narrow tip were to be pushed into the fourth intermediate rod W4 and, therefore, the tubular body 43a would be susceptible to breakage at the tip. Also, even though the tapered peripheral wall face Wba is not formed during the cup forming process, the chamfered portions 10 can be precisely finished during the subsequent drawing process. Accordingly, it is preferred that during the cup forming process the tapered peripheral wall face Wba is not constrained.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of manufacturing an outer race used in a constant velocity universal joint of a tripod type, said constant velocity universal joint comprising a cup body and a shaft extending axially outwardly from a bottom of the cup body in a direction opposite to an open end thereof, said cup body having an inner peripheral surface formed with three axially extending track grooves, said cup body further including a radially outwardly protruding wall portion, aligned with each of the track grooves, and a radially inwardly depressed wall portion aligned with a reduced diameter portion of a peripheral wall of the cup body between each of the track grooves, said protruding and depressed wall portions being so defined as to alternate with each other in a direction substantially circumferentially of the cup body, each of the reduced diameter portions of the peripheral wall of the cup body adjacent the open end of the latter having a chamfered portion defined at a peripheral lip region of the open end of the cup body, said method comprising:
in an upsetting operation, forming
a reduced diameter portion of a substantially cylindrical member, which eventually defines the shaft, and
a large diameter portion of the substantially cylindrical member with an axially inwardly depressed recess defined in an end face of the large diameter portion, the recess having a tapered peripheral wall face, which eventually defines a general shape of each of the chamfered portions, using an upsetting technique;
in a cup forming operation, forming a cup in the substantially cylindrical member by a combined pushing including a forward pushing and a rearward container pushing; and
in a drawing operation, shaping the large diameter portion to a final design dimension and shape using a drawing technique,
said upsetting operation being carried out prior to the cup forming operation, and said cup forming operation being carried out prior to said drawing operation.

2. A method of manufacturing an outer race used in a constant velocity universal joint of a tripod type, said constant velocity universal joint comprising a cup body and a shaft extending axially outwardly from a bottom of the cup body in a direction opposite to an open end thereof, said cup body having an inner peripheral surface formed with three axially extending track grooves, said cup body further including a radially outwardly protruding wall portion, aligned with each of the track grooves, and a radially inwardly depressed wall portion aligned with a reduced diameter portion of a peripheral wall of the cup body between each of the track grooves, said protruding and depressed wall portions being so defined as to alternate with each other in a direction substantially circumferentially of the cup body, each of the reduced diameter portions of the peripheral wall of the cup body adjacent the open end of the latter having a chamfered portion defined at a peripheral lip region of the open end of the cup body, said method comprising:

an upsetting operation to make a generally elongated intermediate member having a small diameter portion and a large diameter portion with an axially inwardly depressed recess defined in an end face of the large diameter portion remote from the small diameter portion, said recess having a tapered peripheral wall face, which defines a general shape of each of the chamfered portions;

a cup forming operation performed subsequent to the upsetting operation, to shape the elongated intermediate member to a shape having the cup body by a combined pushing method including a forward pushing and a rearward container pushing; and a drawing operation to shape the cup body to a final design dimension and shape by a drawing technique.

3. The outer race manufacturing method as claimed in claim 2, wherein the cup forming operation is performed by the combined pushing method using a die to form the shaft and the cup body, and a straight punch to form the track grooves and the reduced diameter portions between the track grooves.

4. The outer race manufacturing method as claimed in claim 3, wherein the drawing operation is carried out by using a die to form the cup body, and a punch to form the track grooves, the reduced diameter portions between the neighboring track grooves, and the chamfered portion at one end of each of the reduced diameter portions adjacent the open end of the cup body.

5. The outer race manufacturing method as claimed in claim 2, wherein the drawing operation is carried out by using a die to form the cup body, and a punch to form the track grooves, the reduced diameter portions between the neighboring track grooves, and the chamfered portion at one end of each of the reduced diameter portions adjacent the open end of the cup body.

6. The outer race manufacturing method as claimed in claim 2, further comprising an axial pushing operation, performed prior to the upsetting operation, to axially push a cylindrical rod member to form the small diameter portion and the large diameter portion of the elongated intermediate member, as well as an intermediate portion connecting the small and large diameter portions together and flaring outwardly in a direction from the small diameter portion towards the large diameter portion.

7. A method, of manufacturing an outer race used in a constant velocity universal joint of a tripod type, said outer race including a cup body having an inner peripheral surface with axially extending track grooves, a radially outwardly protruding wall portion, aligned with each of the track grooves, and a radially inwardly depressed wall portion aligned with a reduced diameter portion of a peripheral wall of the cup body between each of the track grooves, the protruding and depressed wall portions being defined to alternate in a direction substantially circumferentially of the cup body, each of the reduced diameter portions of the peripheral wall of the cup body adjacent the open end of the latter having a chamfered portion defined at a peripheral lip region of an open end of the cup body, the method comprising:

in an upsetting operation, forming a recess in an intermediate member, the recess having a tapered peripheral wall face, which defines a general shape of the chamfered portion;

subsequent to the forming of the recess in the intermediate member, shaping the intermediate member to a shape having the cup body; and subsequent to the shaping of the intermediate member to the shape having the cup body, shaping the cup body to a final design dimension and shape by a drawing technique.

8. A method of manufacturing an outer race used in a constant velocity universal joint of a tripod type, the outer race including a cup body having a chamfered portion defined at a peripheral lip region of an open end of the cup body, and an axially extending track groove and reduced diameter portion, the method comprising:

upsetting a recess in an end portion of an intermediate body, the recess defining a general shape of the chamfered portion;

subsequent to the upsetting, in an operation shaping the intermediate body to a shape having the cup body, forming the track groove and reduced diameter portion while leaving the general shape of the chamfered portion untreated; and subsequent to the shaping of the intermediate body to the shape having the cup body, shaping the cup body to a final design dimension and shape by a drawing technique.

9. The method according to claim 8, wherein the track groove and reduced diameter portion is formed by a straight punch.

10. A method of manufacturing an outer race used in a constant velocity universal joint of a tripod type, the outer race including a cup body having a chamfered portion defined at a peripheral lip region of an open end of the cup body, and an axially extending track groove and reduced diameter portion, the method comprising:

upsetting a recess in an end portion of an intermediate body to form a general shape of the chamfered portion, the recess having a peripheral wall that tapers from a mouth to an end surface;

subsequent to the upsetting, in an operation shaping the intermediate body to a shape having the cup body, forming the track groove and reduced diameter portion in the end surface while leaving the tapered peripheral wall untreated; and subsequent to the shaping of the intermediate body to the shape having the cup body, shaping the cup body to a final design dimension and shape by a drawing technique.

11. The method according to claim 10, wherein the track groove and reduced diameter portion is formed by a straight punch.

12. A method of manufacturing an outer race used in a constant velocity universal joint of a tripod type, the outer race including a cup body having a chamfered portion defined at a peripheral lip region of an open end of the cup body, and an axially extending track groove and reduced diameter portion, the method comprising:

upsetting a recess in an end portion of an intermediate body to form a general shape of the chamfered portion, the recess having a peripheral wall portion tapering from the end portion to a depth of the recess;

subsequent to the upsetting, in an operation shaping the intermediate body to a shape having the cup body, forming the track groove and reduced diameter portion in the recess while leaving the tapered peripheral wall portion untreated; and subsequent to the shaping of the intermediate body to the shape having the cup body, shaping the cup body to a final design dimension and shape by a drawing technique.

13. The method according to claim 12, wherein the track groove and reduced diameter portion is formed by a straight punch.

14. A method of manufacturing an outer race used in a constant velocity universal joint of a tripod type, the outer race including a cup body having a chamfered portion defined at a peripheral lip region of an open end of the cup body, and a cup portion defining a closed end of the cup body, the method comprising:

upsetting the chamfered portion in an end portion of an intermediate body to form a general shape of the chamfered portion;

subsequent to the upsetting, forming the cup portion while leaving the general shape of the chamfered portion untreated; and subsequent to the forming of the cup portion, shaping the cup body to a final design dimension and shape by a drawing technique.

* * * * *